US009615351B2

(12) United States Patent
Zhu et al.

(10) Patent No.: US 9,615,351 B2
(45) Date of Patent: Apr. 4, 2017

(54) METHOD, NETWORK DEVICE, AND BASE STATION FOR PAGING NARROWBAND TERMINAL

(71) Applicant: Huawei Technologies Co., Ltd., Shenzhen (CN)

(72) Inventors: Song Zhu, Beijing (CN); Yue Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 14/550,679

(22) Filed: Nov. 21, 2014

(65) Prior Publication Data

US 2015/0078329 A1    Mar. 19, 2015

Related U.S. Application Data

(63) Continuation of application No. PCT/CN2013/076164, filed on May 23, 2013.

(30) Foreign Application Priority Data

May 23, 2012   (CN) .......................... 2012 1 0161391

(51) Int. Cl.
*H04W 68/02* (2009.01)
*H04L 5/00* (2006.01)
(Continued)

(52) U.S. Cl.
CPC ........... *H04W 68/02* (2013.01); *H04L 5/0005* (2013.01); *H04W 4/005* (2013.01); *H04W 72/048* (2013.01); *H04W 88/08* (2013.01)

(58) Field of Classification Search
None
See application file for complete search history.

(56) References Cited

U.S. PATENT DOCUMENTS

2010/0178941 A1* 7/2010 Chun .................... H04L 1/1832
455/458
2010/0220680 A1* 9/2010 Ramankutty ......... H04W 68/08
370/329
(Continued)

FOREIGN PATENT DOCUMENTS

CN    101262624 A    9/2008
CN    101267596 A    9/2008
(Continued)

OTHER PUBLICATIONS

ZTE Corporation, "TP for evaluation/analysis of reduction of maximum bandwidth," 3GPP TSG RAN WG1 Meeting #68, R1-1202920, Feb. 6-10, 2012, 4 pages.
(Continued)

*Primary Examiner* — Kodzovi Acolatse
(74) *Attorney, Agent, or Firm* — Slater Matsil, LLP

(57) ABSTRACT

Embodiments of the present invention disclose a method for paging a narrowband terminal. The method includes: determining that a paging message for paging a narrowband terminal needs to be sent; sending a paging message including narrowband terminal information to a base station, so that the base station obtains a radio capability of the narrowband terminal according to the narrowband terminal information and transmits the paging message according to the radio capability of the narrowband terminal.

10 Claims, 4 Drawing Sheets

(51) Int. Cl.
*H04W 4/00* (2009.01)
*H04W 72/04* (2009.01)
*H04W 88/08* (2009.01)

(56) References Cited

U.S. PATENT DOCUMENTS

| | | | | |
|---|---|---|---|---|
| 2011/0292893 A1* | 12/2011 | Lee | ............... | H04W 74/002 370/329 |
| 2012/0282956 A1* | 11/2012 | Kim | ............... | H04L 12/5895 455/466 |
| 2013/0155954 A1* | 6/2013 | Wang | ............... | H04W 4/005 370/328 |

FOREIGN PATENT DOCUMENTS

| | | |
|---|---|---|
| CN | 102026156 A | 4/2011 |
| CN | 102158959 A | 8/2011 |
| CN | 102202394 A | 9/2011 |
| EP | 2427028 A1 | 3/2012 |
| WO | 2008156308 A2 | 12/2008 |
| WO | 2011161541 A2 | 12/2011 |
| WO | 2013049768 A1 | 4/2013 |

OTHER PUBLICATIONS

ZTE Corporation, "TP for evaluation/analysis of reduction of maximum bandwidth," 3GPP TSG RAN WG1 Meeting #68, R1-120290, Feb. 6-10, 2012, 4 pages.

* cited by examiner

METHOD, NETWORK DEVICE, AND BASE STATION FOR PAGING NARROWBAND TERMINAL

This application is a continuation of International Application No. PCT/CN2013/076164, filed on May 23, 2013, which claims priority to Chinese Patent Application No. 201210161391.6, filed on May 23, 2012, both of which are hereby incorporated by reference in their entireties.

TECHNICAL FIELD

The present invention relates to the field of communications technologies and, in particular embodiments, to a method, a network device, and a base station for paging a narrowband terminal.

BACKGROUND

An M2M (Machine to Machine) technology connects an item to the Internet through an information sensor to achieve a network of intelligent identification and management. In the developing M2M technology, in order to reduce costs of a terminal, a small-bandwidth low cost terminal (Low cost UE), such as a terminal supporting 1.4M bandwidth, is needed to implement communication. Because the bandwidth supported by such a terminal is relatively small, the terminal is also called a narrowband terminal. In order to support M2M communication over a GSM (Global System for Mobile communications) frequency band, the narrowband terminal needs to be compatible with an existing communication terminal over the GSM frequency band. In order to enable the narrowband terminal to access a broadband network, an extended PBCH can be configured for the narrowband terminal, dedicated configuration information is borne by using the extended PBCH, and the narrowband terminal configures a downlink resource and an uplink resource according to the dedicated configuration information and accesses the broadband network upon completion of the configuration.

After the narrowband terminal accesses the broadband network, if the narrowband terminal is in idle (idle) state and a service arrives, the network side needs to page the narrowband terminal. Because in the prior art, a paging (paging) message is scheduled over a PDCCH (Physical Downlink Control Channel), but the narrowband terminal can hardly detect the PDCCH channel sent over all frequency bands, the network side fails to page the narrowband terminal.

SUMMARY

Embodiments of the present invention provides a method, a network device, and a base station for paging a narrowband terminal, to solve a problem in the prior art that a network side fails to page a narrowband terminal.

To solve the foregoing technical problem, the following technical solutions are disclosed in the embodiments of the present invention.

In one aspect, a method for paging a narrowband terminal is provided, where the method includes: determining that a paging message for paging a narrowband terminal needs to be sent; and sending a paging message including narrowband terminal information to a base station, so that the base station obtains a radio capability of the narrowband terminal according to the narrowband terminal information and transmits the paging message according to the radio capability of the narrowband terminal.

In one aspect, another method for paging a narrowband terminal is provided, where the method includes: receiving a paging message that is sent by a network device and includes narrowband terminal information; and transmitting the paging message according to a radio capability which is of a narrowband terminal and is indicated by the narrowband terminal information, so that the narrowband terminal implements paging access after detecting the paging message.

In one aspect, a network device is provided, where the network device includes: a determining unit, configured to determine that a paging message for paging a narrowband terminal needs to be sent; and a sending unit, configured to send a paging message including narrowband terminal information to a base station after the determining unit determines that the paging message for paging the narrowband terminal needs to be sent, so that the base station obtains a radio capability of the narrowband terminal according to the narrowband terminal information and transmits the paging message according to the radio capability of the narrowband terminal.

In one aspect, a base station is provided, where the base station includes: a receiving unit, configured to receive a paging message that is sent by a network device and includes narrowband terminal information; and a transmitting unit, configured to transmit the paging message according to a radio capability of the narrowband terminal, where the radio capability of the narrowband terminal is indicated by the narrowband terminal information that is included in the paging message received by the receiving unit, so that the narrowband terminal implements paging access after detecting the paging message.

According to embodiments of the present invention, it is determined that a paging message for paging a narrowband terminal needs to be sent, and a paging message including narrowband terminal information is sent to a base station, so that the base station obtains a radio capability of the narrowband terminal according to the narrowband terminal information and transmits the paging message according to the radio capability of the narrowband terminal, and the narrowband terminal implements paging access after detecting the paging message. In the present invention, after the paging message for paging the narrowband terminal is determined, because the narrowband terminal information is added in the paging message, the base station can transmit the paging message according to the radio capability of the narrowband terminal. In the embodiments of the present invention, because the paging message is transmitted according to the radio capability of the narrowband terminal, it can be ensured that the narrowband terminal can detect the paging message, thereby implementing paging access of the narrowband terminal.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, a person of ordinary skill in the art may still derive other drawings according to these accompanying drawings without creative efforts.

DETAILED DESCRIPTION OF ILLUSTRATIVE EMBODIMENTS

To make the objectives, technical solutions, and advantages of the present invention more comprehensible, the following further describes the present invention in detail with reference to the accompanying drawings. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

In order to enable a narrowband terminal to access a broadband network, in the prior art, an extended PBCH (Physical Broadcast Channel) can be configured for the narrowband terminal, dedicated configuration information is borne by using the extended PBCH, and the narrowband terminal configures a downlink resource and an uplink resource according to the dedicated configuration information and accesses a communications system upon completion of the configuration. After the narrowband terminal accesses the broadband network, because in the prior art, a paging message is scheduled over an existing PDCCH, but the narrowband terminal can hardly detect the existing PDCCH sent over all frequency bands, the network side fails to page the narrowband terminal. Therefore, the present invention provides the following embodiments in which paging of the narrowband terminal is implemented.

Figure 1:
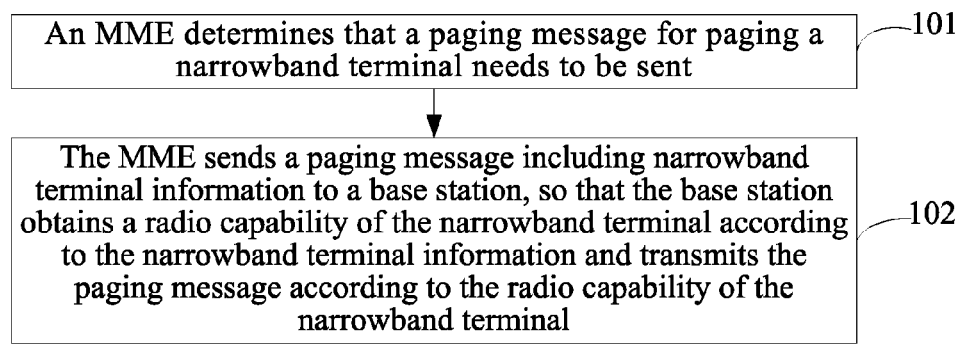
FIG. 1 is a flowchart of a method for paging a narrowband terminal according to an embodiment of the present invention.

FIG. 1 is a flowchart of a method for paging a narrowband terminal according to a first embodiment of the present invention. In this embodiment, a procedure of paging the narrowband terminal is described by using an MME (Mobility Management Entity) in a network device as an executor.

Step 101: The MME determines that a paging message for paging a narrowband terminal needs to be sent.

When the narrowband terminal accesses a network and is in idle state, the MME needs to page the narrowband terminal when finding that a service for the narrowband terminal arrives. In this step, when determining that service data triggering the paging message comes from a dedicated network device of the narrowband terminal, the MME can determine that the paging message for paging the narrowband terminal needs to be sent, where the dedicated network device may be a dedicated server of the narrowband terminal or a dedicated gateway of the narrowband terminal; in addition, when determining, according to a terminal ID of a terminal corresponding to the service data, that the terminal is a narrowband terminal, the MME can also determine that the paging message for paging the narrowband terminal needs to be sent. Generally, the service data carries a terminal ID of a corresponding terminal, and terminal IDs and terminal attributes (a narrowband terminal or not) of all terminals entered during subscription with the network are stored in the MME. Therefore, the MME can search for a corresponding terminal attribute according to the terminal ID in the service data to determine whether the terminal is a narrowband terminal.

Step 102: The MME sends a paging message including narrowband terminal information to a base station, so that the base station obtains a radio capability of the narrowband terminal according to the narrowband terminal information and transmits the paging message according to the radio capability of the narrowband terminal.

In this embodiment, a capability type included in a radio capability of a narrowband terminal may be the same as a capability type included in a radio capability of a common terminal, while capability content of the radio capabilities may be different, which means the capability content of the radio capability in this embodiment needs to be applicable to the narrowband terminal. Because the radio capability of the narrowband terminal includes many capability types, for different narrowband terminals, some may adopt a capability type the same as a capability type of a common terminal and some may adopt a capability type different from a capability type of a common terminal. The radio capability (Low Cost MTC) of the narrowband terminal may include: a bandwidth supported by the narrowband terminal, a coding and modulation scheme supported by the narrowband terminal, a resource location of a time-frequency resource monitored by the narrowband terminal, a scrambling scheme supported by the narrowband terminal, and the like.

In this step, the MME may send a paging message including the radio capability of the narrowband terminal to the base station, so that the base station transmits the paging message according to the radio capability of the narrowband terminal. Because the paging message sent by the MME includes the radio capability of the narrowband terminal, the base station can directly read the radio capability.

Alternatively, the MME may send a paging message including a narrowband terminal indication to the base station, so that the base station acquires a prestored radio capability of the corresponding narrowband terminal according to the narrowband terminal indication and transmits the paging message according to the radio capability of the narrowband terminal. The paging message sent by the MME does not include the radio capability of the narrowband terminal, and the narrowband terminal indication is merely identification information indicating that the paging message is used to page the narrowband terminal. After determining, according to the narrowband terminal indication, that the narrowband terminal needs to be paged, the base station acquires the radio capability of the narrowband terminal stored on the base station, and transmits the paging message according to the acquired radio capability.

According to the foregoing embodiment, after it is determined that a paging message is used to page a narrowband terminal, because narrowband terminal information is added in the paging message, a base station is allowed to transmit the paging message according to a radio capability of the narrowband terminal. In the embodiment of the present invention, because the paging message is transmitted according to the radio capability of the narrowband terminal, it can be ensured that the narrowband terminal can detect the paging message, thereby implementing paging access of the narrowband terminal.

Figure 2:
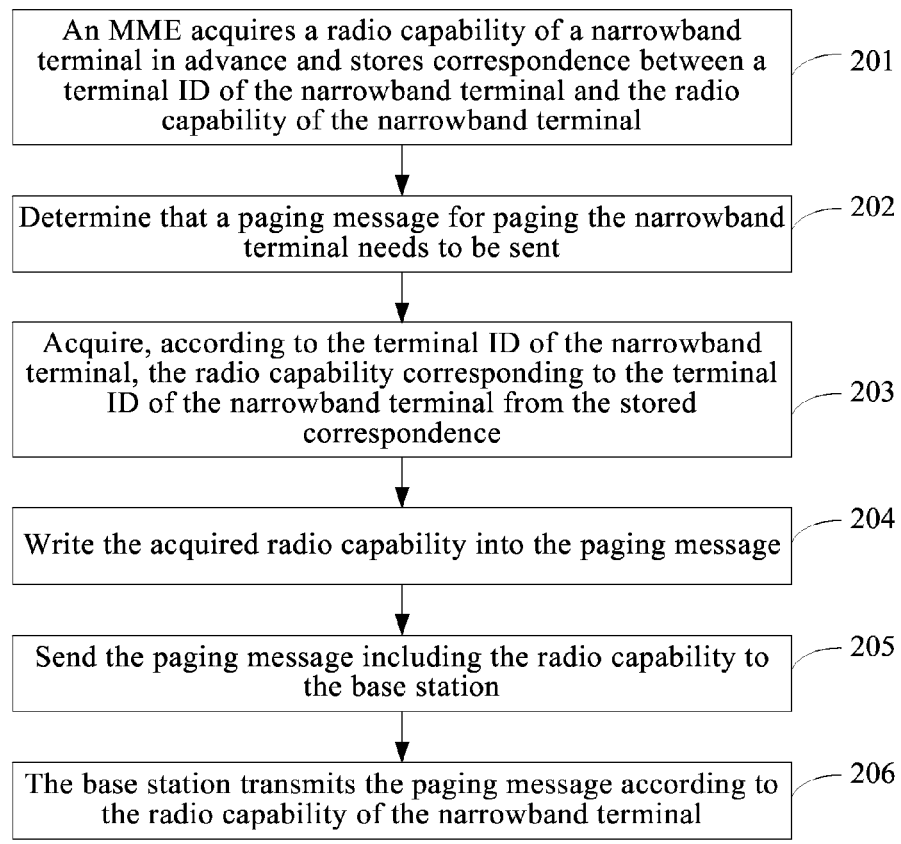
FIG. 2 is a flowchart of a method for paging a narrowband terminal according to another embodiment of the present invention.

FIG. 2 is a flowchart of a method for paging a narrowband terminal according to a second embodiment of the present invention. This embodiment illustrates a procedure in which an MME prestores a radio capability of the narrowband terminal and directly writes the radio capability of the narrowband terminal into a paging message, so as to implement paging of the narrowband terminal.

Step 201: The MME acquires the radio capability of the narrowband terminal in advance and stores correspondence between a terminal ID of the narrowband terminal and the radio capability of the narrowband terminal.

In this embodiment, a capability type included in a radio capability of a narrowband terminal may be the same as a capability type included in a radio capability of a common terminal, while capability content of the radio capabilities may be different, which means the capability content of the radio capability in this embodiment needs to be applicable to the narrowband terminal. Because the radio capability of the narrowband terminal includes many capability types, for different narrowband terminals, some may adopt a capability type the same as a capability type of a common terminal and some may adopt a capability type different from a capability type of a common terminal. The radio capability of the narrowband terminal may include: a bandwidth supported by the narrowband terminal, a coding and modulation scheme supported by the narrowband terminal, a resource location of a time-frequency resource monitored by the narrowband terminal, a scrambling scheme supported by the narrowband terminal, and the like.

In this embodiment, the MME may acquire the radio capability of the narrowband terminal in the following manners.

A first manner: The MME acquires, from a NAS (Non-Access Stadium non-access stratum) message transparently transmitted by a base station, the radio capability of the narrowband terminal borne in the NAS message, where the NAS message is transparently transmitted by the base station to the MME when the narrowband terminal is performing attachment to a network or a tracking area update.

When performing the Attach (attachment to a network) or the TAU (Tracking Area Update), the narrowband terminal sends a NAS message to the MME, where the NAS message bears the radio capability of the narrowband terminal, and the NAS message is transparently transmitted through the eNB to the MME. After receiving the NAS message, the MME acquires the radio capability of the narrowband terminal borne in the NAS message.

A second manner: After determining, according to at least one type of information of an IMSI (International Mobile Subscriber Identity) and an IMEI (International Mobile Equipment Identity) of the terminal, that the terminal is a narrowband terminal, the MME acquires the radio capability of the narrowband terminal from a network device storing the at least one type of the information.

The MME may obtain the radio capability of the corresponding narrowband terminal from an HSS (Home Subscriber Server) or an HLR (Home Location Register) according to the IMSI, or acquire the radio capability of the narrowband terminal from a dedicated server of the narrowband terminal (Low Cost MTC Server) or a dedicated gateway of the narrowband terminal (Low Cost MTC Gateway).

A third manner: The MME acquires the radio capability of the narrowband terminal from a terminal capability information indication sent by the base station, where the radio capability of the narrowband terminal is a radio capability acquired by the base station from a message sent by the narrowband terminal.

The narrowband terminal may send a message to the eNB, where the message bears the radio capability of the narrowband terminal. After receiving the message, the eNB acquires the radio capability of the narrowband terminal borne in the message, writes the radio capability into a UE CII (Capability Information Indication), and notifies the MME of the UE CII through an S1 interface between the eNB and the MME. The MME acquires the radio capability of the narrowband terminal from the received UE CII. If the radio capability of the narrowband terminal already exists, the stored radio capability is updated with the radio capability of the narrowband terminal acquired from the UE CII. The message that the narrowband terminal sends to the eNB may specifically be an RRC (Radio Resource Control, radio resource control) message.

A fourth manner: The MME acquires the radio capability of the narrowband terminal from a notification message sent by the base station, where the radio capability of the narrowband terminal is a radio capability that is acquired by the base station according to an extended random access resource adopted by the narrowband terminal to access a network and corresponds to the extended random access resource.

When the eNB determines that the terminal is a narrowband terminal according to a network access situation of the terminal, for example, the eNB determines that the terminal is a narrowband terminal when the terminal adopts an extended random access resource specifically configured for a narrowband terminal to access the network, the base station may acquire, according to information included in the extended random access resource, a radio capability corresponding to the extended random access resource, uses the radio capability as the radio capability of the narrowband terminal, writes the radio capability into a UE CII, and notifies the MME of the UE CII, and the MME acquires the radio capability of the narrowband terminal from the received UE CII. The extended random access resource may be a time-frequency resource used by or a preamble (Preamble) borne in an RACH (Random Access Channel).

After acquiring the radio capability of the narrowband terminal, the MME needs to store the correspondence between the terminal ID of the narrowband terminal and the radio capability of the narrowband terminal to ensure that in the future, the radio capability of the corresponding narrowband terminal can be found according to the terminal ID.

Step 202: Determine that a paging message for paging a narrowband terminal needs to be sent.

When the narrowband terminal accesses a network and is in idle state, the MME needs to page the narrowband terminal when finding that a service for the narrowband terminal arrives. In this step, when determining that service data triggering the paging message comes from a dedicated network device of the narrowband terminal, the MME can determine that the paging message for paging the narrowband terminal needs to be sent, where the dedicated network device may be a dedicated server of the narrowband terminal or a dedicated gateway of the narrowband terminal; in addition, when determining, according to a terminal ID of a terminal corresponding to the service data, that the terminal is a narrowband terminal, the MME can also determine that the paging message for paging the narrowband terminal needs to be sent. Generally, the service data carries a terminal ID of a corresponding terminal, and terminal IDs and terminal attributes (a narrowband terminal or not) of all terminals entered during subscription with the network are stored in the MME. Therefore, the MME can search for a corresponding terminal attribute according to the terminal ID in the service data to determine whether the terminal is a narrowband terminal.

Step 203: Acquire, according to the terminal ID of the narrowband terminal, the radio capability corresponding to the terminal ID of the narrowband terminal from the stored correspondence.

Step 204: Write the acquired radio capability into the paging message.

Step 205: Send the paging message including the radio capability to the base station.

Step 206: The base station transmits the paging message according to the radio capability of the narrowband terminal.

Because the radio capability of the narrowband terminal includes many capability types, for different narrowband terminals, some may adopt a capability type the same as a capability type of a common terminal and some may adopt a capability type different from a capability type of a common terminal. Therefore, in this embodiment, the base station may transmit the paging message according to the radio capability of the narrowband terminal in at least one of the following manners: according to a maximum bandwidth supported by the narrowband terminal, bear a control message of the paging message and the paging message in a radio resource that matches the maximum bandwidth; send the paging message over a location of a time-frequency resource monitored by the narrowband terminal; send the paging message over a subframe resource monitored by the narrowband terminal; scramble control information of the paging message according to an RNTI (Radio Network Temporary Identifier) that can be decoded by the narrowband terminal, and send the scrambled paging message; and, code and modulate the paging message according to the coding and modulation scheme supported by the narrowband terminal, and send the coded and modulated paging message.

According to the foregoing embodiment, after it is determined that a paging message is used to page a narrowband terminal, because a radio capability of the narrowband terminal is added in the paging message, a base station is allowed to directly transmit the paging message according to the radio capability of the narrowband terminal included in the paging message. In the embodiment of the present invention, because the paging message is transmitted according to the radio capability of the narrowband terminal, it can be ensured that the narrowband terminal can detect the paging message, thereby implementing paging access of the narrowband terminal.

Figure 3:
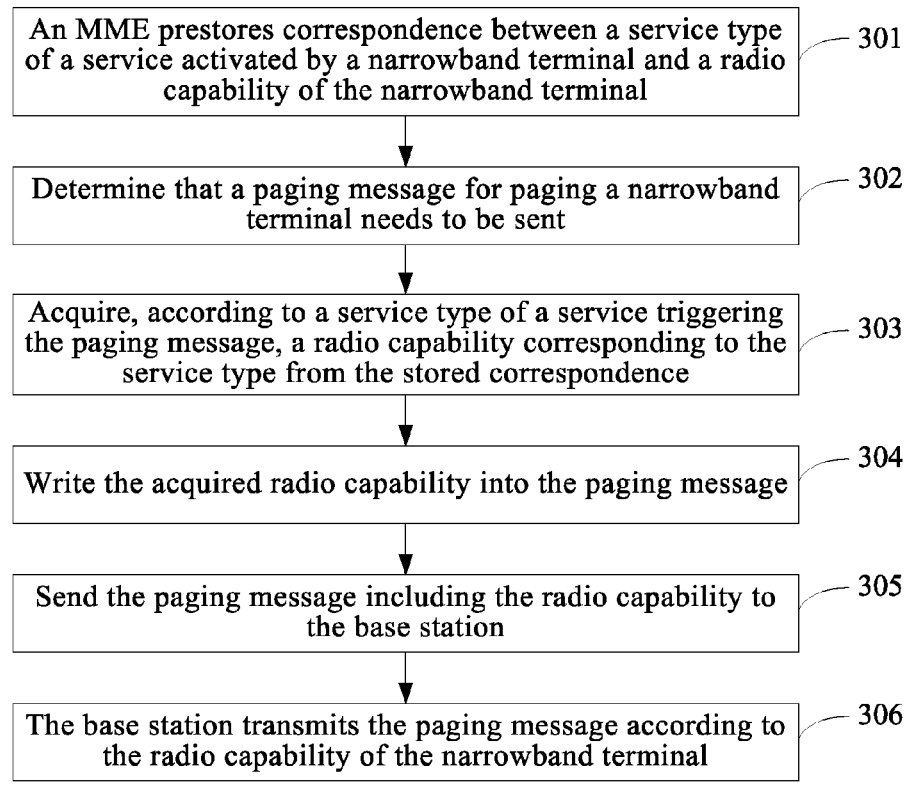
FIG. 3 is a flowchart of a method for paging a narrowband terminal according to another embodiment of the present invention.

FIG. 3 is a flowchart of a method for paging a narrowband terminal according to a third embodiment of the present invention. This embodiment illustrates a procedure in which an MME prestores correspondence between a service type of a service activated by the narrowband terminal and a radio capability of the narrowband terminal, and directly writes the radio capability of the narrowband terminal into a paging message, so as to implement paging of the narrowband terminal.

Step 301: The MME prestores the correspondence between the service type of the service activated by the narrowband terminal and the radio capability of the narrowband terminal.

Certain narrowband terminals are used to implement specific services and configured with particular DRX (Discontinuous Reception, discontinuous reception) periods; therefore, after these narrowband terminals activate a specific service, the configured DRX of narrowband terminals is triggered and paging message will be transmitted at a specific paging occasion. For example, when activating a specific service, a certain narrowband terminal may establish a specific PDN (Public Data Network) connection or a specific bearer; a PCRF (Policy and Charging Rules Function) may define a radio capability of the narrowband terminal and corresponding service information according to information about the connection or bearer established above, and the PCRF transmits the defined information to the MME through a PCEF (Policy and Charging Enforcement Function); and, the MME stores the correspondence between the radio capability of the narrowband terminal activating the specific service and a service type of the specific service.

Step 302: Determine that a paging message for paging a narrowband terminal needs to be sent.

When the narrowband terminal accesses a network and is in idle state, the MME needs to page the narrowband terminal when finding that a service for the narrowband terminal arrives. In this step, when determining that service data triggering the paging message comes from a dedicated network device of the narrowband terminal, the MME can determine that the paging message for paging the narrowband terminal needs to be sent, where the dedicated network device may be a dedicated server of the narrowband terminal or a dedicated gateway of the narrowband terminal; in addition, when determining, according to a terminal ID of a terminal corresponding to the service data, that the terminal is a narrowband terminal, the MME can also determine that the paging message for paging the narrowband terminal needs to be sent. Generally, the service data carries a terminal ID of a corresponding terminal, and terminal IDs and terminal attributes (a narrowband terminal or not) of all terminals entered during subscription with the network are stored in the MME. Therefore, the MME can search for a corresponding terminal attribute according to the terminal ID in the service data to determine whether the terminal is a narrowband terminal.

Step 303: Acquire, according to the service type of the service triggering the paging message, a radio capability corresponding to the service type from the stored correspondence.

Step 304: Write the acquired radio capability into the paging message.

Step 305: Send the paging message including the radio capability to a base station.

Step 306: The base station transmits the paging message according to the radio capability of the narrowband terminal.

Because the radio capability of the narrowband terminal includes many capability types, for different narrowband terminals, some may adopt a capability type the same as a capability type of a common terminal and some may adopt a capability type different from a capability type of a common terminal. Therefore, in this embodiment, the base station may transmit the paging message according to the radio capability of the narrowband terminal in at least one of the following manners: according to a maximum bandwidth supported by the narrowband terminal, bear a control message of the paging message and the paging message in a radio resource that matches the maximum bandwidth; send the paging message according to a location of a time-frequency resource monitored by the narrowband terminal; send the paging message according to a subframe resource monitored by the narrowband terminal; scramble control information of the paging message according to an RNTI that can be decoded by the narrowband terminal, and send the scrambled paging message; and, code and modulate the paging message according to a coding and modulation scheme supported by the narrowband terminal, and send the coded and modulated paging message.

According to the foregoing embodiment, after it is determined that a paging message is used to page a narrowband terminal, because a radio capability of the narrowband terminal is added in the paging message, a base station is allowed to directly transmit the paging message according to the radio capability of the narrowband terminal included in the paging message. In the embodiment of the present invention, because the paging message is transmitted according to the radio capability of the narrowband terminal, it can be ensured that the narrowband terminal can detect the paging message, thereby implementing paging access of the narrowband terminal.

Figure 4:
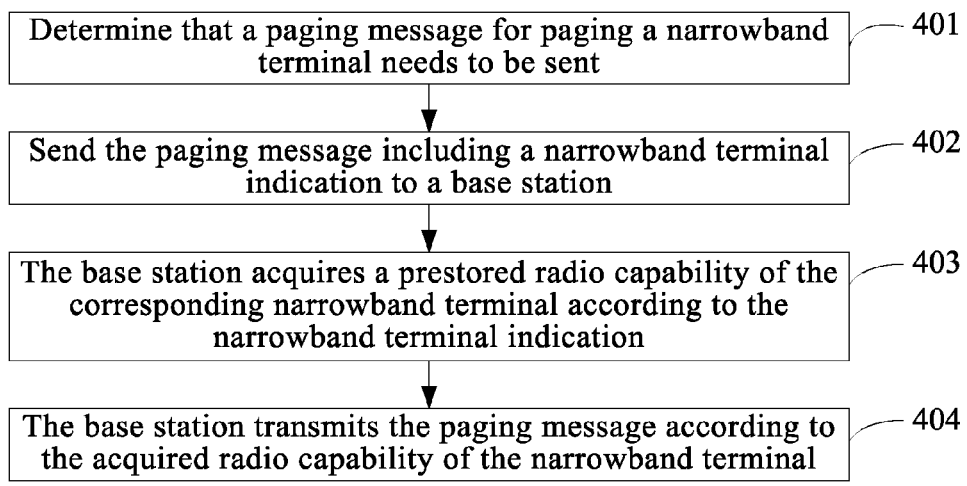
FIG. 4 is a flowchart of a method for paging a narrowband terminal according to another embodiment of the present invention.

FIG. 4 is a flowchart of a method for paging a narrowband terminal according to a fourth embodiment of the present invention. This embodiment illustrates a procedure in which an MME adds a narrowband terminal indication into a paging message, and a base station acquires a prestored radio capability of the narrowband terminal according to the narrowband terminal indication, so as to implement paging of the narrowband terminal.

Step 401: Determine that a paging message for paging a narrowband terminal needs to be sent.

In this step, when the narrowband terminal accesses a network and is in idle state, the MME needs to page the narrowband terminal when finding that a service for the narrowband terminal arrives. In this step, when determining that service data triggering the paging message comes from a dedicated network device of the narrowband terminal, the MME can determine that the paging message for paging the narrowband terminal needs to be sent, where the dedicated network device may be a dedicated server of the narrowband terminal or a dedicated gateway of the narrowband terminal; in addition, when determining, according to a terminal ID of a terminal corresponding to the service data, that the terminal is a narrowband terminal, the MME can also determine that the paging message for paging the narrowband terminal needs to be sent. Generally, the service data carries a terminal ID of a corresponding terminal, and terminal IDs and terminal attributes (a narrowband terminal or not) of all terminals entered during subscription with the network are stored in the MME. Therefore, the MME can search for a corresponding terminal attribute according to the terminal ID in the service data to determine whether the terminal is a narrowband terminal.

Step 402: Send the paging message including the narrowband terminal indication to the base station.

Different from the foregoing embodiments, in this embodiment, the paging message sent by the MME includes only the narrowband terminal indication but does not include a radio capability of the narrowband terminal, where the narrowband terminal indication is merely identification information indicating that the paging message is used to page the narrowband terminal. After determining, according to the narrowband terminal indication, that the narrowband terminal needs to be paged, the base station acquires the radio capability of the narrowband terminal stored on the base station, and transmits the paging message according to the acquired radio capability.

In this step, the MME may send the paging message including the narrowband terminal indication to the base station in any one of the following manners:

A first manner: The MME sends a paging message with the narrowband terminal indication added to a new information field to the base station.

In the prior art, the paging message sent by the MME has a specific format. In this embodiment, a new information field can be added to the paging message, and the narrowband terminal indication is added to the information field, for example, "Low cost" is added, to indicate that the paging message is used to page a narrowband terminal.

A second manner: A paging message is sent to the base station through a dedicated MME of the narrowband terminal, where that the paging message is sent by the dedicated MME of the narrowband terminal implies the narrowband terminal indication.

As narrowband terminals access a network, some dedicated MMEs of the narrowband terminal are deployed in the network. When it is determined that a narrowband terminal needs to be paged, a paging message can be sent to a base station by a dedicated MME. When identifying, according to the received paging message, that the paging message is sent by the dedicated MME, the base station can determine that the paging message is used to page the narrowband terminal. This is equivalent to a case that the paging message sent by the dedicated MME implies the narrowband terminal indication.

A third manner: The MME sends a generated paging message in a preset format to the base station, where the preset format represents the narrowband terminal indication.

The MME can generate a new paging message different from an existing paging message according to the preset format, for example, by increasing a length of the paging message, or by adding a specific indication field to the paging message, provided that the paging message in the preset format can be distinguished from the existing paging message. After receiving the paging message in the preset format, the base station can determine that the paging message is used to page the narrowband terminal.

A fourth manner: The MME sends a paging message including a terminal ID of the narrowband terminal to the base station, where the terminal ID is used as the narrowband terminal indication.

When the narrowband terminal accesses the network, the base station can store the terminal ID and a terminal attribute (a narrowband terminal or not) of the terminal entered during subscription with the network. After receiving the paging message that includes the terminal ID and is sent by the MME, the base station can find the corresponding terminal attribute according to the terminal ID, and if the found terminal attribute indicates a narrowband terminal, determine that the paging message is used to page a narrowband terminal.

Step 403: The base station acquires a prestored radio capability of the corresponding narrowband terminal according to the narrowband terminal indication.

The base station may store the radio capability of the narrowband terminal in one of two manners.

A first manner: Search for a prestored generic radio capability of all narrowband terminals according to the narrowband terminal indication in the paging message.

All narrowband terminals accessing the network adopt a same radio capability, so the base station only needs to store the generic radio capability of the narrowband terminals. When the base station determines, according to the paging message sent by the MME, that the paging message is used to page the narrowband terminal, the base station directly acquires the stored radio capability.

A second manner: Search for, according to the narrowband terminal ID included in the paging message, a prestored radio capability which is of the narrowband terminal and corresponds to the terminal ID.

If narrowband terminals accessing the network have different radio capabilities, when a narrowband terminal accesses the network, the base station can, in addition to storing a terminal ID and a terminal attribute (a narrowband terminal or not) of the narrowband terminal, further store correspondence between the terminal ID and a radio capability, In this case, when acquiring the terminal ID from the paging message sent by the MME and determining, according to the terminal ID, to page the narrowband terminal, the base station further acquires the radio capability corresponding to the terminal ID.

Step 404: The base station transmits the paging message according to the acquired radio capability of the narrowband terminal.

Because the radio capability of the narrowband terminal includes many capability types, for different narrowband terminals, some may adopt a capability type the same as a capability type of a common terminal and some may adopt a capability type different from a capability type of a common terminal. Therefore, in this embodiment, the base station may transmit the paging message according to the radio capability of the narrowband terminal in at least one of the following manners: according to a maximum bandwidth supported by the narrowband terminal, bear a control message of the paging message and the paging message in a radio resource that matches the maximum bandwidth; send the paging message according to a location of a time-frequency resource monitored by the narrowband terminal; send the paging message according to a subframe resource monitored by the narrowband terminal; scramble control information of the paging message according to an RNTI that can be decoded by the narrowband terminal, and send the scrambled paging message; and, code and modulate the paging message according to a coding and modulation scheme supported by the narrowband terminal, and send the coded and modulated paging message.

According to the foregoing embodiment, after it is determined that a paging message is used to page a narrowband terminal, because a narrowband terminal indication is added in the paging message, a base station is allowed to acquire a prestored radio capability according to the narrowband terminal indication and transmit the paging message according to the radio capability. In the embodiment of the present invention, because the paging message is transmitted according to the radio capability of the narrowband terminal, it can be ensured that the narrowband terminal can detect the paging message, thereby implementing paging access of the narrowband terminal.

Figure 5:
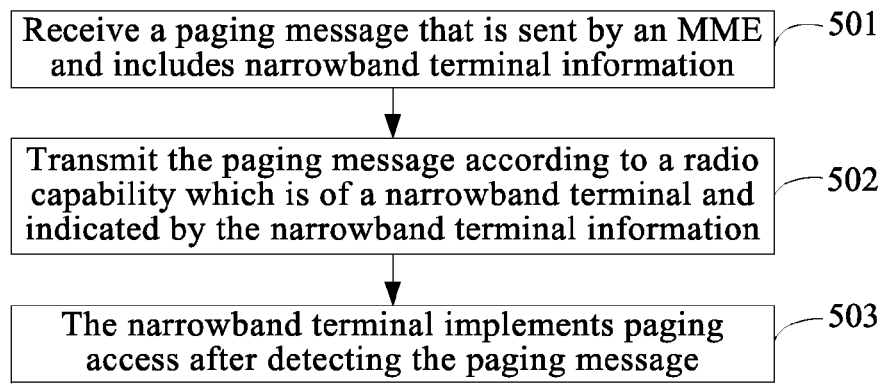
FIG. 5 is a flowchart of a method for paging a narrowband terminal according to another embodiment of the present invention.

FIG. 5 is a flowchart of a method for paging a narrowband terminal according to a fifth embodiment of the present invention. In this embodiment, a procedure of paging the narrowband terminal from a network side is described, where an MME is still used as an example of a network device for description.

Step 501: Receive a paging message that is sent by the MME and includes narrowband terminal information.

In this step, the base station may receive a paging message that is sent by the MME and includes a radio capability of the narrowband terminal. For a specific implementation of sending, by the MME, the paging message including the radio capability of the narrowband terminal, reference may be made to the descriptions of the second and the third embodiments. Alternatively, the base station may also receive a paging message that is sent by the MME and includes a narrowband terminal indication. For a specific implementation of sending, by the MME, the paging message including the narrowband terminal indication, reference may be made to the description of the fourth embodiment.

Step 502: Transmit the paging message according to the radio capability which is of the narrowband terminal and is indicated by the narrowband terminal information.

When receiving the paging message that is sent by the MME and includes the radio capability of the narrowband terminal, the base station reads the radio capability of the narrowband terminal from paging message, and transmits the paging message according to the radio capability of the narrowband terminal.

When receiving the paging message that is sent by the MME and includes the narrowband terminal indication, the base station can acquire a prestored radio capability of the narrowband terminal according to the narrowband terminal indication in the paging message, and transmit the paging message according to the radio capability of the narrowband terminal. The base station can search for the prestored radio capability which is of the narrowband terminal and corresponds to the terminal ID according to the narrowband terminal ID included in the paging message, or search for a prestored generic radio capability of all narrowband terminals according to the narrowband terminal indication in the paging message.

Because the radio capability of the narrowband terminal includes many capability types, for different narrowband terminals, some may adopt a capability type the same as a capability type of a common terminal and some may adopt a capability type different from a capability type of a common terminal. Therefore, in this embodiment, the base station may transmit the paging message according to the radio capability of the narrowband terminal in at least one of the following manners: according to a maximum bandwidth supported by the narrowband terminal, bear a control message of the paging message and the paging message in a radio resource that matches the maximum bandwidth; send the paging message according to a location of a time-frequency resource monitored by the narrowband terminal; send the paging message according to a subframe resource monitored by the narrowband terminal; scramble control information of the paging message according to an RNTI that can be decoded by the narrowband terminal, and send the scrambled paging message; and, code and modulate the paging message according to a coding and modulation scheme supported by the narrowband terminal, and send the coded and modulated paging message.

Step 503: The narrowband terminal implements paging access after detecting the paging message.

According to the foregoing embodiment, after it is determined that a paging message is used to page a narrowband terminal, because narrowband terminal information is added in the paging message, a base station is allowed to transmit the paging message according to a radio capability of the narrowband terminal. In the embodiment of the present invention, because the paging message is transmitted according to the radio capability of the narrowband terminal, it can be ensured that the narrowband terminal can detect the paging message, thereby implementing paging access of the narrowband terminal.

Corresponding to the method embodiments for paging a narrowband terminal in the present invention, the present invention further provides embodiments of a network device and a base station for paging the narrowband terminal. An exemplary network device for paging the narrowband terminal may be an MME.

Figure 6:
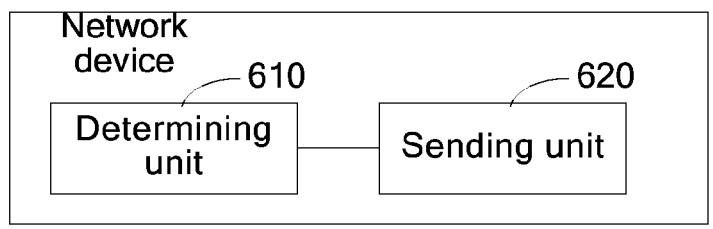
FIG. 6 is a block diagram of a network device according to an embodiment of the present invention.

FIG. 6 is a block diagram of a network device according to a first embodiment of the present invention:

The network device includes: a determining unit 610 and a sending unit 620.

The determining unit 610 is configured to determine that a paging message for paging a narrowband terminal needs to be sent.

In an embodiment, the determining unit 610 may be specifically configured to, when service data triggering the paging message comes from a dedicated network device of the narrowband terminal, determine that the paging message for paging the narrowband terminal needs to be sent. In another embodiment, the determining unit 610 may also be specifically configured to, when determining, according to a terminal ID of a terminal corresponding to service data, that the corresponding terminal is a narrowband terminal, determine that the paging message for paging the narrowband terminal needs to be sent.

The sending unit 620 is configured to send a paging message including narrowband terminal information to a base station after the determining unit 610 determines that the paging message for paging the narrowband terminal needs to be sent, so that the base station obtains a radio capability of the narrowband terminal according to the narrowband terminal information and transmits the paging message according to the radio capability of the narrowband terminal.

In an embodiment, the sending unit 620 may be specifically configured to send a paging message including a radio capability of the narrowband terminal to a base station after the determining unit 610 determines that the paging message for paging the narrowband terminal needs to be sent, so that the base station reads the radio capability of the narrowband terminal from the paging message, and transmits the paging message according to the radio capability of the narrowband terminal.

In another embodiment, the sending unit 620 may also be specifically configured to send a paging message including a narrowband terminal indication to a base station after the determining unit 610 determines that the paging message for paging the narrowband terminal needs to be sent, so that the base station acquires a prestored radio capability of the corresponding narrowband terminal according to the narrowband terminal indication, and transmits the paging message according to the radio capability of the narrowband terminal. The sending unit 620 may be specifically configured to send a paging message with the narrowband terminal indication added in a new information field to the base station; or send a paging message to the base station through a dedicated MME of the narrowband terminal, where that the paging message is sent by the dedicated MME of the narrowband terminal implies the narrowband terminal indication; or send a generated paging message in a preset format to the base station, where the preset format represents the narrowband terminal indication; or send a paging message including a terminal ID of the narrowband terminal to the base station, where the terminal ID is used as the narrowband terminal indication.

Figure 7:
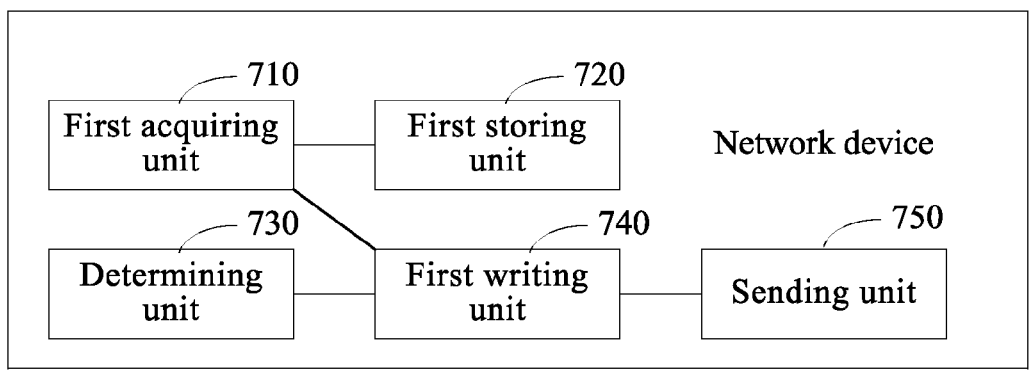
FIG. 7 is a block diagram of a network device according to another embodiment of the present invention.

FIG. 7 is a block diagram of a network device according to a second embodiment of the present invention:

The network device includes: a first acquiring unit 710, a first storing unit 720, a determining unit 730, a first writing unit 740, and a sending unit 750.

The first acquiring unit 710 is configured to acquire a radio capability of a narrowband terminal in advance.

The first acquiring unit 710 is specifically configured to acquire, from a NAS message transparently transmitted by a base station, the radio capability of the narrowband terminal borne in the NAS message, where the NAS message is a message transparently transmitted by the base station when the narrowband terminal is performing attachment to a network or a tracking area update; or after it is determined, according to an IMSI or an IMEI of the terminal, that a terminal is a narrowband terminal, acquire the radio capability of the narrowband terminal from a network device storing the IMSI or the IMEI; or acquire the radio capability of the narrowband terminal from a terminal capability information indication sent by the base station, where the radio capability of the narrowband terminal is a radio capability acquired by the base station from a message sent by the narrowband terminal; or acquire the radio capability of the narrowband terminal from a radio capability notification message sent by the base station, where the radio capability of the narrowband terminal is a radio capability that is acquired by the base station according to an extended random access resource adopted by the narrowband terminal to access a network and corresponds to the extended random access resource.

The first storing unit 720 is configured to store correspondence between a terminal ID which is of the narrowband terminal and acquired by the first acquiring unit 710 and the radio capability which is of the narrowband terminal and acquired by the first acquiring unit 710.

The determining unit 730 is configured to determine that a paging message for paging a narrowband terminal needs to be sent.

The first acquiring unit 710 is further configured to acquire, according to the terminal ID of the narrowband terminal, the radio capability corresponding to the terminal ID from the correspondence stored by the first storing unit 720.

The first writing unit 740 is configured to write the radio capability acquired by the first acquiring unit 710 into the paging message.

The sending unit 750 is configured to send the paging message that includes the radio capability of the narrowband terminal written by the first writing unit 740, so that the base station reads the radio capability of the narrowband terminal from the paging message, and transmits the paging message according to the radio capability of the narrowband terminal.

Figure 8:
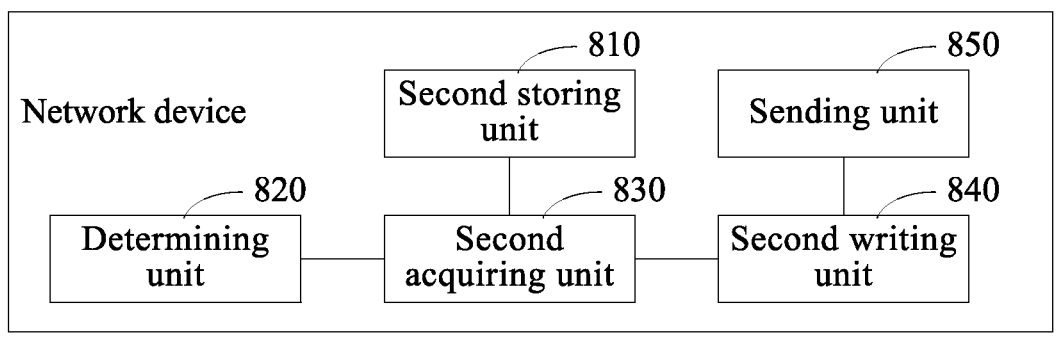
FIG. 8 is a block diagram of a network device according to another embodiment of the present invention.

FIG. 8 is a block diagram of a network device according to a third embodiment of the present invention.

The network device includes: a second storing unit 810, a determining unit 820, a second acquiring unit 830, a second writing unit 840, and a sending unit 850.

The second storing unit 810 is configured to prestore correspondence between a service type of a service activated by a narrowband terminal and a radio capability of the narrowband terminal.

The determining unit 820 is configured to determine that a paging message for paging a narrowband terminal needs to be sent.

The second acquiring unit 830 is configured to acquire, according to a service type of a service triggering the paging message, a radio capability corresponding to the service type from the correspondence stored by the second storing unit 810.

The second writing unit 840 is configured to write the radio capability acquired by the second acquiring unit 830 into the paging message.

The sending unit 850 is configured to send the paging message that includes the radio capability of the narrowband terminal written by the second writing unit 840, so that the base station reads the radio capability of the narrowband terminal from the paging message, and transmits the paging message according to the radio capability of the narrowband terminal.

Figure 9:
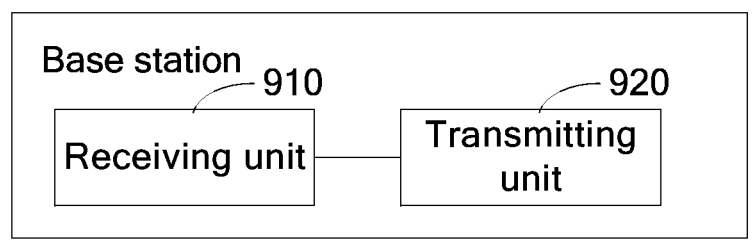
FIG. 9 is a block diagram of a base station according to an embodiment of the present invention.

FIG. 9 is a block diagram of a base station according to an embodiment of the present invention.

The base station includes: a receiving unit 910 and a transmitting unit 920.

The receiving unit 910 is configured to receive a paging message that is sent by a network device and includes narrowband terminal information.

The transmitting unit 920 is configured to transmit the paging message according to a radio capability of the narrowband terminal, where the radio capability of the narrowband terminal is indicated by the narrowband terminal information that is included in the paging message received by the receiving unit, so that the narrowband terminal implements paging access after detecting the paging message.

In an embodiment, the receiving unit 910 is specifically configured to receive a paging message that is sent by the network device and includes a radio capability of a narrowband terminal; and the transmitting unit 920 is specifically configured to read the radio capability of the narrowband terminal from the paging message received by the receiving unit 910 and transmit the paging message according to the radio capability of the narrowband terminal.

In another embodiment, the receiving unit 910 is specifically configured to receive a paging message that is sent by the network device and includes a narrowband terminal indication; and the transmitting unit 920 may include (not shown in FIG. 9): a capability acquiring subunit, configured to acquire a prestored radio capability of the narrowband terminal according to the narrowband terminal indication in the paging message received by the receiving unit 910; and a message transmitting subunit, configured to transmit the paging message according to the radio capability of the narrowband terminal acquired by the capability acquiring subunit. The capability acquiring subunit may be specifically configured to search for, according to a narrowband terminal ID included in the paging message, a prestored radio capability corresponding to the terminal ID, or search for a prestored generic radio capability of all narrowband terminals according to the narrowband terminal indication in the paging message.

The transmitting unit 920 may be specifically configured to, according to a maximum bandwidth supported by the narrowband terminal, bear a control message of the paging message and the paging message in a radio resource that matches the maximum bandwidth; or, send the paging message according to a location of a time-frequency resource monitored by the narrowband terminal; or, send the paging message according to a subframe resource monitored by the narrowband terminal; or, scramble control information of the paging message according to an RNTI that can be decoded by the narrowband terminal, and send the scrambled paging message; or, code and modulate the paging message according to a coding and modulation scheme supported by the narrowband terminal, and send the coded and modulated paging message.

According to the foregoing embodiment, a paging message including narrowband terminal information is sent to a base station, and the base station transmits the paging message according to a radio capability of the narrowband terminal, so that the narrowband terminal implements paging access after detecting the paging message. In the embodiment of the present invention, after it is determined that a paging message is used to page a narrowband terminal, because narrowband terminal information is added in the paging message, a base station is allowed to transmit the paging message according to a radio capability of the narrowband terminal. In the embodiment of the present invention, because the paging message is transmitted according to the radio capability of the narrowband terminal, it can be ensured that the narrowband terminal can detect the paging message, thereby implementing paging access of the narrowband terminal.

It should be noted that in the foregoing user equipment and base station embodiments, all units included are classified only according to functions and logic, but the present invention is not limited to the classification as long as a corresponding function can be implemented. In addition, specific names of the functional units are only used for differentiation, and are not intended to limit the protection scope of the present invention.

In addition, a person of ordinary skill in the art may understand that all or a part of the steps in the foregoing method embodiments may be performed by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for paging a narrowband terminal, the method comprising:
   determining that a paging message for paging the narrowband terminal needs to be sent; and
   sending a paging message comprising narrowband terminal information of the narrowband terminal to a base station, the narrowband terminal information indicating a radio capability of the narrowband terminal, and enabling the base station to transmit the paging message to the narrowband terminal in a control channel in accordance with the radio capability for the narrowband terminal to detect the paging message carried in the control channel sent by the base station; wherein the narrowband terminal information comprises the radio capability of the narrowband terminal;
   pre-acquiring the radio capability of the narrowband terminal;
   storing a correspondence between a terminal identity (ID) of the narrowband terminal and the radio capability of the narrowband terminal; and
   before sending the paging message, acquiring, according to the terminal ID of the narrowband terminal, the radio capability corresponding to the terminal ID from the stored correspondence, and writing the acquired radio capability into the paging message.

2. The method according to claim 1, wherein pre-acquiring the radio capability of the narrowband terminal comprises at least one of:
   acquiring, from a non-access stratum (NAS) message transparently transmitted by the base station, the radio capability of the narrowband terminal borne in the NAS message,
   wherein the NAS message is a message transparently transmitted by the base station when the narrowband terminal is performing attachment to a network or a tracking area update;
   after it is determined, according to an international mobile subscriber identity (IMSI) or an international mobile equipment identity (IMEI) of the narrowband terminal, that the narrowband terminal is a narrowband terminal, acquiring the radio capability of the narrowband terminal from a network device storing the IMSI or the IMEI;
   acquiring the radio capability of the narrowband terminal from a terminal capability information indication sent by the base station, wherein the radio capability of the narrowband terminal is a radio capability acquired by the base station from a message sent by the narrowband terminal; or
   acquiring the radio capability of the narrowband terminal from a radio capability notification message sent by the base station, wherein the radio capability of the narrowband terminal is a radio capability that is acquired by the base station according to an extended random access resource adopted by the narrowband terminal to access a network and corresponds to the extended random access resource.

3. The method according to claim 1, further comprising:
   prestoring a correspondence between a service type of a service activated by the narrowband terminal and the radio capability of the narrowband terminal; and
   before sending the narrowband terminal information, acquiring, according to a service type of a service triggering the paging message, the radio capability corresponding to the service type of the service triggering the paging message from the prestored stored correspondence, and writing the acquired radio capability into the paging message.

4. The method according to claim 1, wherein the narrowband terminal information comprises a narrowband terminal indication indicating the narrowband terminal whereby the base station transmits the paging message according to the radio capability of the narrowband terminal after acquiring the radio capability of the narrowband terminal according to the narrowband terminal indication.

5. The method according to claim 4, wherein sending the paging message comprises at least one of:
   Sending the paging message with the narrowband terminal indication added in a new information field of the paging message to the base station;
   sending the paging message to the base station through a dedicated mobility management entity (MME) of the narrowband terminal, wherein the paging message sent by the dedicated MME of the narrowband terminal indicates the narrowband terminal;
   sending a generated paging message in a preset format to the base station, wherein the generated paging message in the preset format indicates the narrowband terminal; or
   sending a paging message comprising a terminal ID of the narrowband terminal to the base station, wherein the terminal ID indicates the narrowband terminal.

6. A network device, comprising:
   a processor, configured to determine that a paging message for paging a narrowband terminal needs to be sent; and
   a transmitter, configured to send a paging message comprising narrowband terminal information of the narrowband terminal to a base station after the processor determines that the paging message for paging the narrowband terminal needs to be sent, the narrowband terminal information indicating a radio capability of the narrowband terminal, and enabling the base station to transmit the paging message to the narrowband terminal in a control channel in accordance with the radio capability for the narrowband terminal to detect the paging message carried in the control channel sent by the base station; wherein the narrowband terminal information comprises the radio capability of the narrowband terminal, whereby so the paging message is configured in the base station reads the radio capability of the narrowband terminal from the paging message and transmits the paging message according to the radio capability of the narrowband terminal; wherein the processor is further configured to:
   pre-acquire the radio capability of the narrowband terminal; and
   store a correspondence between a terminal ID of the narrowband terminal and the radio capability of the narrowband terminal, the terminal ID and the radio capability acquired by a first acquiring unit.

7. The network device according to claim 6, the processor is further configured to:
   acquire, according to the terminal ID of the narrowband terminal, the radio capability corresponding to the terminal ID from the correspondence stored by a first storing unit; and
   write the radio capability into the paging message.

8. The network device according to claim 6, wherein the radio capability of the narrowband terminal is pre-acquired:
   acquiring, from a NAS message transparently transmitted by the base station, the radio capability of the narrowband terminal borne in the NAS message, wherein the NAS message is a message transparently transmitted by the base station when the narrowband terminal is performing attachment to a network or a tracking area update; or
   after it is determined, according to an IMSI or an IMEI of the narrowband terminal, that the narrowband terminal is a narrowband terminal, acquiring the radio capability of the narrowband terminal from a network device storing the IMSI or the IMEI; or
   acquiring the radio capability of the narrowband terminal from a terminal capability information indication sent by the base station, wherein the radio capability of the narrowband terminal is a radio capability acquired by the base station from a message sent by the narrowband terminal; or
   acquiring the radio capability of the narrowband terminal from a radio capability notification message sent by the base station, wherein the radio capability of the narrowband terminal is a radio capability that is acquired by the base station according to an extended random access resource adopted by the narrowband terminal to access a network and corresponds to the extended random access resource.

9. The network device according to claim 6, wherein the narrowband terminal information comprises a narrowband terminal indication indicating the narrowband terminal, whereby the base station acquires the radio capability of the narrowband terminal according to the narrowband terminal indication, and transmits the paging message according to the radio capability of the narrowband terminal.

10. The network device according to claim 9, wherein the transmitter is further configured to:
- send the paging message with the narrowband terminal indication added to a new information field of the paging message to the base station; or
- send the paging message to the base station through a dedicated MME of the narrowband terminal, wherein the paging message sent by the dedicated MME of the narrowband terminal indicates the narrowband terminal; or
- send a generated paging message in a preset format to the base station, wherein the generated paging message in the preset format indicates the narrowband terminal; or send the paging message comprising a terminal ID of the narrowband terminal to the base station, wherein the terminal ID as indicates the narrowband terminal.

\* \* \* \* \*